March 10, 1964 D. HOLLEY ETAL 3,124,241
COMPOSITE PAPERBOARD AND PLASTIC CONTAINER
Filed March 21, 1960 2 Sheets-Sheet 1
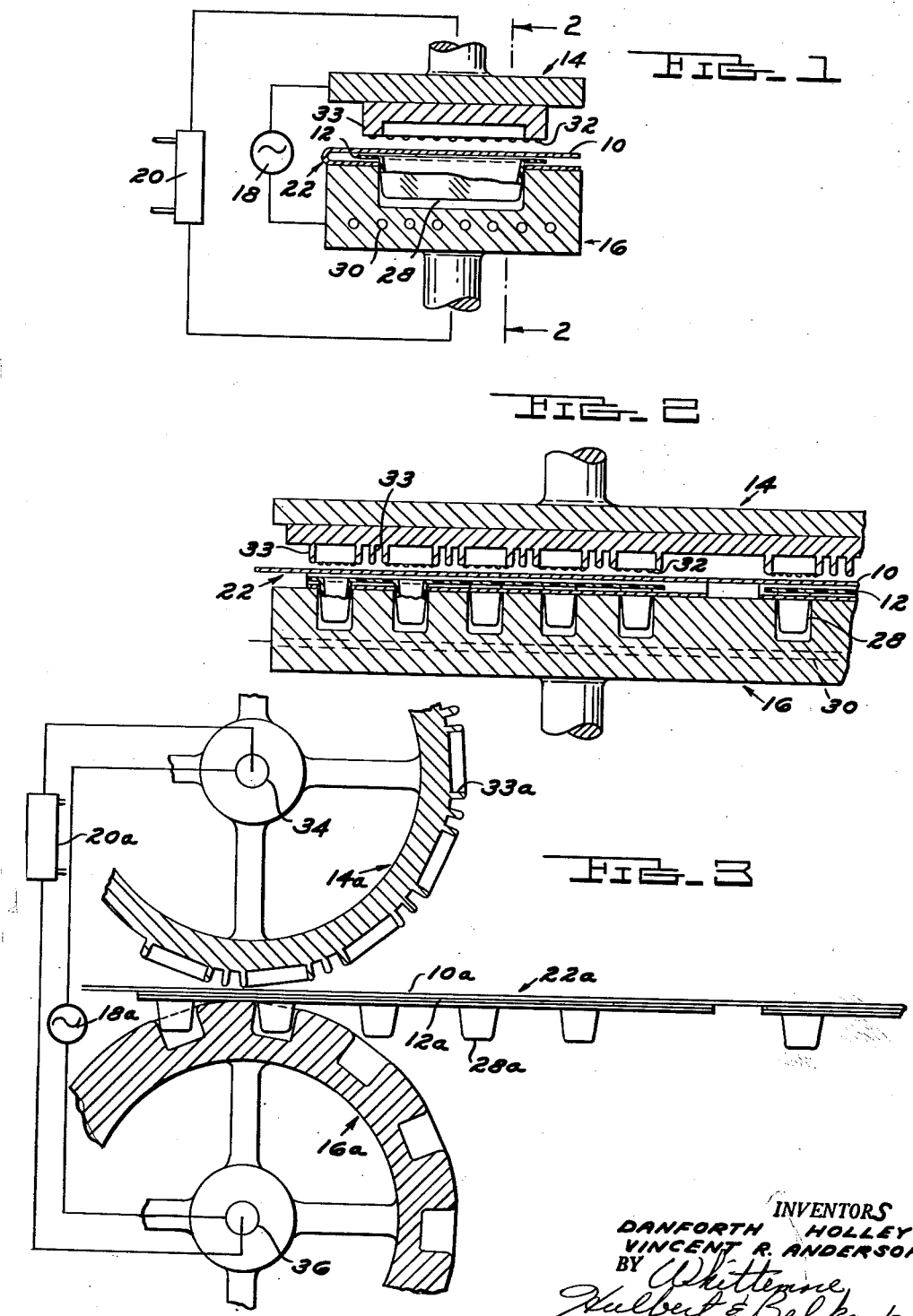
INVENTORS
DANFORTH HOLLEY
VINCENT R. ANDERSON
BY
Hulbert & Belknap
ATTORNEYS

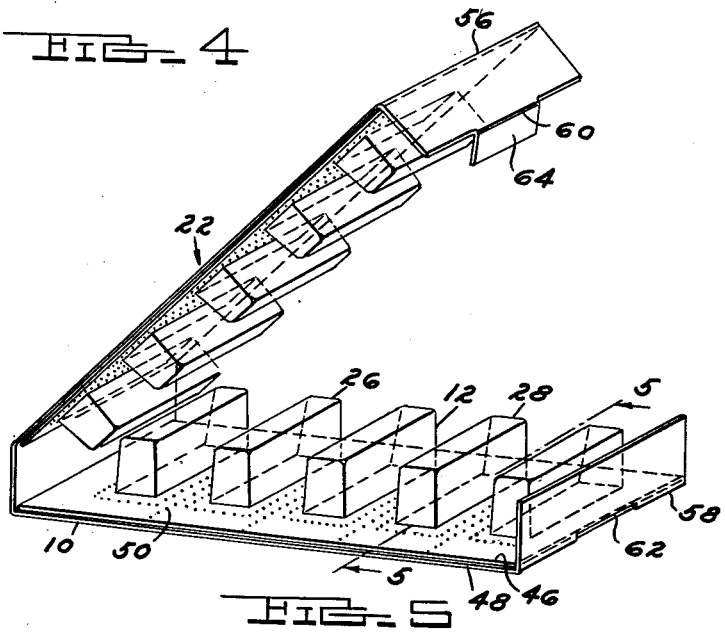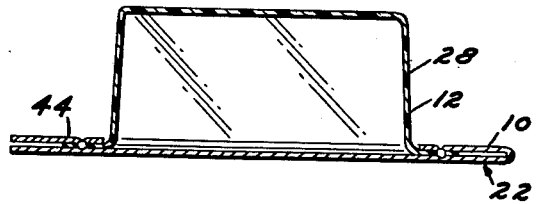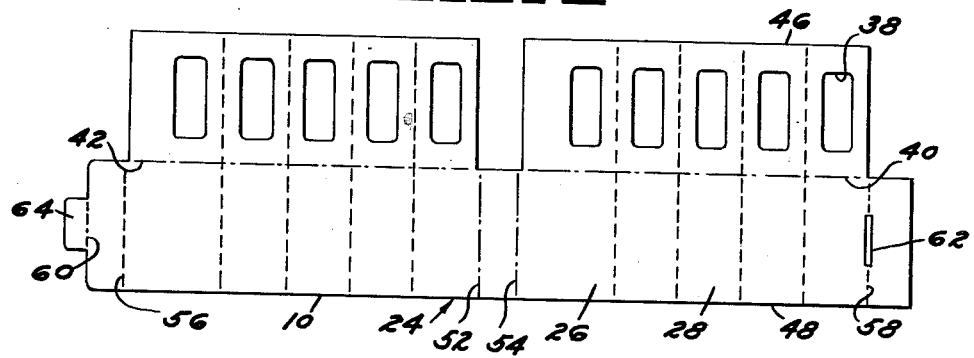

United States Patent Office

3,124,241
Patented Mar. 10, 1964

3,124,241
COMPOSITE PAPERBOARD AND PLASTIC
CONTAINER
Danforth Holley, Grosse Pointe Farms, and Vincent R.
Anderson, Rochester, Mich., assignors to Holley Plastics
Company, Warren, Mich., a corporation of Michigan
Filed Mar. 21, 1960, Ser. No. 16,506
8 Claims. (Cl. 206—45.31)

The present invention relates generally to combination paper board and plastic constructions and refers more specifically to a method of and means for sealing uncoated paper board to plastic sheets and a multi-capsule package formed thereby.

In the past it has been known to seal sheets of paper board after they have been coated or otherwise treated with plastic to plastic sheets to form laminated constructions thereof. The plastic and paper board laminated material has however not been used in many applications wherein it would be advantageous except for the expense incurred in the production thereof. Therefore the elimination of the heretofore considered necessary step of first coating the paper board with a plastic material before sealing the paper board to a plastic sheet is desirable in that combined paper board and plastic constructions could therefore be produced more economically.

In addition while it has previously been known to seal plastic sheets to paper board by heat applied thereto with the paper board and plastic sheets under pressure, in the past such sealing of paper board to plastic sheets has been relatively slow and often ununiform due to the method of producing the heat and applying the pressure to the plastic sheets and paper board.

Further combination paper board and plastic constructions particularly of the type wherein a plastic capsule containing small articles to which a paper board closing member is sealed have in the past had undesirable features which have limited the use of this type of package. For example single unit packages of the type described have a tendency to become deformed due to the differential shrinkage of the plastic and the paper board over a large sealing area. Also such packages are difficult to handle and ship in that they are not readily stacked or otherwise stored without the necessity of being first placed in a separate container. Thus with such packaging in the past extra expense has been incurred in handling and shipping.

Therefore one of the objects of the present invention is to provide a method of sealing uncoated paper board to plastic material.

Another object is to provide improved means for sealing paper board to plastic sheets.

Another object is to provide an improved multi-capsule combination paper board and plastic package.

Another object is to provide a multi-capsule container wherein articles are positioned in plastic capsules which are sealed to paper board which paper board is folded into the form of a container convenient for storing and shipping.

More specifically it is an object of the present invention to provide a method of sealing thermoplastic capsules to relatively porous paper board uncoated with plastic material, comprising heating the paper board and plastic capsules by a high frequency signal while the paper board and plastic capsules are held together under pressure.

More specifically another object is to provide means for sealing uncoated paper board to plastic sheets comprising a stationary electrode on which the plastic and paper board may be rested in position to be sealed together, a movable electrode having sealing members on the face thereof adapted to contact the material to be sealed together along the lines on which it is desired to produce the seal on convergence of the electrodes, means for heating the material and means for bringing the electrodes together under pressure.

Another object is to provide means for sealing uncoated paper board to plastic material as set forth above wherein the means for heating the material includes a source of high frequency connected to the electrodes to create a high frequency electrical signal therebetween.

Another object is to provide means for sealing uncoated paper board to plastic material as set forth above wherein said electrodes comprise a pair of rotating members adapted to pass the paper board and plastic material therebetween to provide rapid sealing of the paper board and plastic material.

Another object is to provide means for sealing plastic material to uncoated paper board as set forth above wherein one of the electrodes is provided with projections extending outwardly therefrom adapted to mechanically deform the paper board and plastic material to be sealed together whereby the mechanical bond between the paper board and plastic material on sealing thereof is improved.

Another object is to provide a multiple capsule paper board and plastic package comprising a series of plastic capsules having an annular outwardly extending flange which flange is sandwiched between an elongated strip of paper board which is folded along a longitudinal fold line with the plastic capsules extending through one surface of the folded paper board to provide a series of spaced plastic capsules held together by means of the paper board which may contain articles for sale or display.

Another object is to provide a multi-capsule combination plastic and paper board package as disclosed above wherein the paper board is uncoated and is sealed to the plastic capsule around the flange thereof.

Another object is to provide a multi-capsule combination plastic and uncoated paper board package wherein a deep seal is provided between adjacent capsules to permit ready disengagement of a single capsule from the package.

Another object is to provide a pair of multi-capsule combination plastic and uncoated paper board packages as set forth above connected by means of an intermediate portion of the paper board which is adapted to be folded so that the intermediate portion forms the end of a container for the packages and wherein end tabs adapted to be secured together are provided at the unconnected ends of the packages to provide closure means for the container formed by the two packages connected together whereby a complete container for the individual packages is provided.

Another object is to provide a complete container as set forth above wherein the individual multi-capsule packages are so constructed that on folding together of the connected packages the individual capsules thereof nest between each other to conserve storage space and add rigidity to the complete container.

Another object is to provide a method of and means for sealing uncoated paper board to plastic sheets and a multi-capsule package formed thereby which are simple, economical and efficient.

Other objects and features of the invention will become apparent as the description proceeds, especially when taken in conjunction with the accompanying drawings, illustrating a preferred embodiment of the invention, wherein:

FIGURE 1 is a section view of means for sealing a plastic material to uncoated paper board in accordance with the invention.

FIGURE 2 is a sectional view of the means for sealing uncoated paper board to plastic material illustrated in FIGURE 1 taken on the line 2—2 in FIGURE 1.

FIGURE 3 is a diagrammatic illustration of a modification of the means for sealing uncoated paper board to plastic material illustrated in FIGURE 1 which is particularly adapted to rapid production of a plurality of seals between the paper board and plastic.

FIGURE 4 is a perspective view of a container formed of a pair of multi-capsule combination paper board and plastic material packages constructed according to the invention.

FIGURE 5 is a section view of the container illustrated in FIGURE 4 taken on the line 5—5 in FIGURE 4.

FIGURE 6 is a plan view of a paper board blank from which the container illustrated in FIGURE 4 may be produced showing a sheet of plastic material in which a plurality of longitudinally spaced capsules have been formed in position on the paper board blank.

With particular reference to the figures an embodiment of the present invention will now be disclosed.

As illustrated in FIGURE 1 in accordance with the invention uncoated paper board 10 is sealed to plastic material 12 through the application of heat and pressure to laminations of the paper board and plastic material by means of the electrodes 14 and 16 connected to the source of high frequency 18 and pressure applying means 20.

In further accordance with the invention a complete container 22 as shown in FIGURE 4 is formed from a blank 24 of uncoated paper board 10 and a pair of plastic sheets 26 having individual capsules 28 formed therein through sealing of the uncoated paper board to the plastic material as shown in FIGURE 1. The complete container provides individual capsules in which articles may be packaged which may readily be removed from the container while permitting shipping of the individual capsules in the complete container without the necessity of using other special cartons.

More specifically the uncoated paper board 10 is bonded to the plastic material 12 by heating the plastic material and paper board through the application of a high frequency alternating signal to the electrodes 14 and 16 as shown in FIGURE 1. The high frequency signal produces molecular motion of the materials placed between the electrodes to cause heat to be generated through the entire thickness of the materials.

Additional heat may be imparted to the materials through heating of the electrodes by conventional means 30 which may be for example resistance type electrical heaters. Good results have been obtained by conventionally heating the electrodes to between 180° F. and 220° F. With the heating of the paper board and plastic material pressure is applied between the electrodes 14 and 16 by conventional means such as a hydraulic cylinder indicated 20 to complete the seal between the paper board and plastic material Since the material 12 is thermoplastic, such as cellulose acetate, cellulose acetate butyrate or vinyl and the paper board 10 is relatively porous virgin fiber board such as kraft board, bleached sulphate paper, or white patent coated news print under twenty thousands of an inch thick, on the application of heat and pressure to these material a bond is formed therebetween which is primarily of a mechanical nature and which seals the relatively porous board to the plastic material on subsequent cooling of the plastic material.

The power requirements of the electronic high frequency producing apparatus varies with the area to be sealed at one time and the sealing time for example a one-half kilowatt machine has been found sufficient to seal twenty lineal inches from 1/16 to 1/8 of an inch in thickness in one or two seconds while a five kilowatt machine is necessary to seal two hundred lineal inches of the same type seal in the same time. The usual frequencies for heating of plastic sheets which are well known in the art will be used.

Similarly the pressure requirements are variable depending on the thickness of both the board and plastic sheet and the hardness of the board. Good sealing results have been obtained with pressures varying between one hundred pounds per square inch and one thousand pounds per square inch with the softer boards requiring less pressure.

Thus the paper board and plastic material are sealed together without the necessity of first coating the paper board with a plastic so that the sealing of the paper board to the plastic material is carried out more economically due to the deletion of a heretofore considered necessary step and the elimination of the coating material.

The mechanical bond between the plastic material and paper board obtained by the procedure set forth may be increased by the provision of outwardly extending projections such as nipples 32 on the material contacting surfaces of the electrodes which produce indentations in the material being sealed together.

It will be understood that a variety of configurations of the nipples 32 and other projections may be used in place of the nipples 32 to increase the mechanical bond between the paper board and plastic material, each of which are intended to be included in the present invention.

The electrodes 14 and 16 illustrated in FIGURES 1 and 2 are of the type wherein one electrode is held in a substantially fixed position while the other electrode is caused to move vertically with respect thereto to apply pressure between the paper board 10 and plastic material 12.

The electrode 14 as shown includes sealing members 33 extending toward electrode 16. The sealing members 33 press the paper board and plastic material together on convergence of the electrodes 14 and 16 to form seal lines when the plastic is heated. As shown in the figures sealing members are provided extending around the periphery of capsules and transversely between adjacent capsules 28. Thus each capsule 28 is individually sealed and means are provided to separate individual capsules from the complete container 22.

The electrode 16 includes cavities therein in which the capsules 22 are positioned during the sealing of the paper board to the plastic material. The paper board 10 and plastic material 12 are thus held in position during sealing thereof to each other.

It is contemplated that modifications of the electrodes 14 and 16 may also be used. One such modification of the electrodes 14 and 16 is indicated in FIGURE 3 wherein the electrodes 14a and 16a are circular electrodes which may be given rotary motion by means of the shafts 34 and 36 to pass elongated paper board and plastic material members therebetween and to continuously seal the members together in a manner which will be understood by those in the art.

The structure illustrated in FIGURE 3 is particularly advantageous in the production of a plurality of containers such as illustrated in FIGURE 4 wherein the blanks 24 made from uncoated paper board 10 are sealed to the sheets of thermoplastic material 26 to produce the container 22 as shown.

The container 22 illustrated best in FIGURE 4 as previously indicated is formed from a blank 24 of uncoated paper board 10 and a pair of similar sheets of plastic 26 having individual capsules 28 formed therein. The container 22 has the desirable features of providing an exterior container for multi-capsule packages formed by the manner indicated above without the use of a substantial amount of additional material.

Further it will be noted that the individual plastic capsules of the container 22 nest within each other with the container in the closed position due to the particular construction of the container 22 which saves storage space and makes the finished container a more rigid construction.

In addition it will be noted that deep seals are provided in the paper board and plastic material between the individual capsules of the container 22 by members 33 of electrode 14 whereby when it is so desired an individual plastic capsule may be removed from the container easily. Furthermore with the deep seal separating means the individual plastic capsules are not subject to accidental displacement from the containers. Alternatively the plastic may be partially cut and the paper board perforated between individual capsules of a multi-capsule container.

As indicated previously the container illustrated in FIGURE 4 is formed from a blank 24 shown in FIGURE 6 made of uncoated paper board 10 in conjunction with a pair of plastic sheets in which individual capsules adapted to contain articles to be packaged have been formed in the usual manner.

In forming the container 22 the articles to be packaged are first placed in the individual capsules 28 in the sheets 26. The sheets 26 are then positioned on the paper board blank 24 as shown in FIGURE 6 at the right. The blank having openings 38 therein positioned to fit over the individual capsules 28 is then folded along the dotted lines 40 and 42 to produce the cross section illustrated best in FIGURE 5 wherein the flange 44 of the individual capsule 28 is sandwiched between the portion 46 and the portion 48 of the blank 24.

The uncoated paper board 10 of the blank 24 is then sealed to the plastic sheets 26 about each of the plastic capsules in the manner shown in FIGURES 1 or 3 to produce a primarily mechanical seal therebetween. In addition as previously mentioned a deep seal 50 is provided between the individual capsules to permit easy removal of the individual capsules from a finished container.

The blank 24 is then folded along the dotted lines 52, 54, 56, 58 and 60 in the manner shown in FIGURE 4 to provide a finished container. The slot 62 is provided in conjunction with the tab 64 to provide locking means for the container 22 on insertion of the tab 64 through the slot 62 as will be understood. Also it will be noted that the openings 38 are so positioned in the blank 24 as to provide the interlocking relationship of the individual capsules in the finished container previously referred to.

Thus according to the invention there is provided a method of sealing uncoated paper board to plastic material through high frequency heating of the materials and the application of pressure thereto and means are taught by which the sealing may be accomplished. Further in accordance with the invention a multi-capsule uncoated paper board and plastic container which serves as a storage and shipping container for individual multi-capsule packages formed through the sealing of plastic material to uncoated paper board has been provided.

The drawings and the foregoing specification constitute a description of the improved method of and means for electronic sealing of plastic sheets to paper board and a container produced thereby in such full, clear, concise and exact terms as to enable any person skilled in the art to practice the invention, the scope of which is indicated by the appended claims.

What we claim as our invention is:

1. A container comprising a pair of composite paper board and plastic packages, each of said composite packages comprising an elongated plastic strip having a plurality of longitudinally spaced capsules formed therein, and an elongated sheet of paper board having a central, longitudinally extending fold line dividing said sheet of paper board into two portions between which the plastic strip is sandwiched, one of said portions having openings therein through which said plastic capsules extend, said paper board being bonded to said elongated plastic strip on both sides thereof about the periphery of each of the spaced capsules, a paper board connection between one end of the composite packages for holding said composite packages in spaced apart parallel relation and closure tabs secured to the other end of said packages for holding said container in a closed position.

2. A container as set forth in claim 1 wherein the capsules of said composite packages are spaced longitudinally thereof so as to interfit in nesting relation when said container is in closed position to add strength and rigidity to the closed container.

3. A container as set forth in claim 1 wherein deep seal lines are provided between the individual capsules of said composite packages to facilitate the ready removal of individual capsules from said composite packages.

4. A container as set forth in claim 1 wherein said paper board is not coated with plastic and said paper board and plastic strip are sealed together only by pressure and heat without a plastic to plastic bond therebetween.

5. A container as set forth in claim 1 wherein said closure tabs comprise an extension of one portion of said paper board at each end thereof substantially equal in length to the depth of the plastic capsules, one of said tabs having a slot therein at the inner edge thereof, the other of said tabs including a further extension which further extension is adapted to fit within said slot.

6. A blank of paper board uncoated with plastic material adapted to be folded to form a container for a plurality of plastic capsules, said blank comprising an elongated strip of paper board having a laterally central longitudinal fold line and a longitudinally centrally located notch extending transversely thereof for substantially half the transverse dimension thereof, a plurality of longitudinally spaced openings at one side thereof, and closing tabs at each end of said elongated strip of paper board.

7. A container comprising a pair of composite paper board and plastic packages, each of said composite packages comprising an elongated plastic strip having a plurality of longitudinally spaced capsules formed therein, and an elongated sheet of paper board having a central, longitudinally extending fold line dividing said sheet of paper board into two portions between which the plastic strip is sandwiched, one of said portions having openings therein through which said plastic capsules extend, said paper board being bonded to said elongated plastic strip on both sides thereof about the periphery of each of the spaced capsules, a paper board connection between one edge of the composite packages for holding said composite packages in spaced apart parallel relation and closure tabs secured to the opposite edge of said packages for holding said container in a closed position.

8. A blank of paper board adapted to be folded to form a container for a plurality of plastic capsules, said blank comprising an elongated strip of paper board having a laterally central longitudinal fold line and a longitudinally centrally located notch extending transversely thereof for substantially half the transverse dimension thereof, a plurality of longitudinally spaced openings at one side thereof, and closing tabs at each end of said elongated strip of paper board.

References Cited in the file of this patent

UNITED STATES PATENTS

| | | |
|---|---|---|
| 1,866,323 | Russell | July 5, 1932 |
| 2,158,971 | Stratton | May 16, 1939 |
| 2,357,339 | Mathieu | Sept. 5, 1944 |
| 2,491,423 | Snyder | Dec. 13, 1949 |
| 2,667,437 | Zoubek | Jan. 26, 1954 |
| 2,706,165 | Korsgaard | Apr. 12, 1955 |
| 2,757,793 | Deitz | Aug. 7, 1956 |
| 2,813,624 | Phipps | Nov. 19, 1957 |
| 2,884,127 | Neary | Apr. 28, 1959 |
| 2,892,538 | Middleton et al. | June 30, 1959 |
| 2,908,383 | Vogt | Oct. 13, 1959 |

(References on following page)

| | UNITED STATES PATENTS | | | FOREIGN PATENTS | |
|---|---|---|---|---|---|
| 2,917,167 | Gregory | Dec. 15, 1959 | 577,150 | Great Britain | May 7, 1946 |
| 2,921,672 | Ivy et al. | Jan. 19, 1960 | 958,491 | France | Sept. 12, 1949 |
| 2,937,746 | Ferguson | May 24, 1960 | 778,658 | Great Britain | July 10, 1957 |
| 2,941,575 | Malmberg | June 21, 1960 | 1,157,532 | France | Dec. 30, 1957 |
| 2,984,346 | Holley | May 16, 1961 | 1,168,643 | France | Sept. 1, 1958 |
| 3,074,540 | Beich et al. | Jan. 22, 1963 | 1,177,554 | France | Dec. 1, 1958 |